United States Patent Office 3,337,021
Patented Aug. 22, 1967

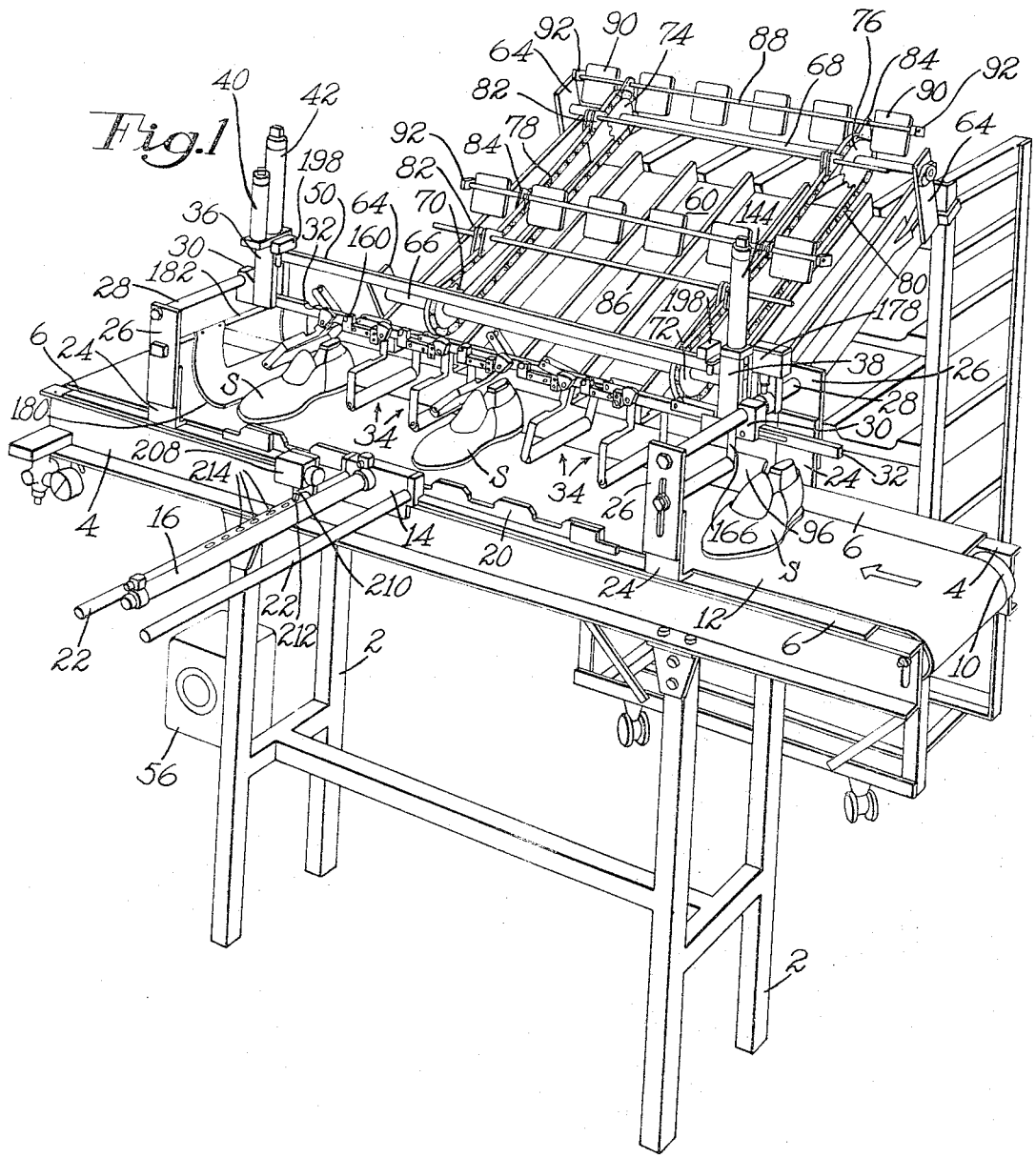

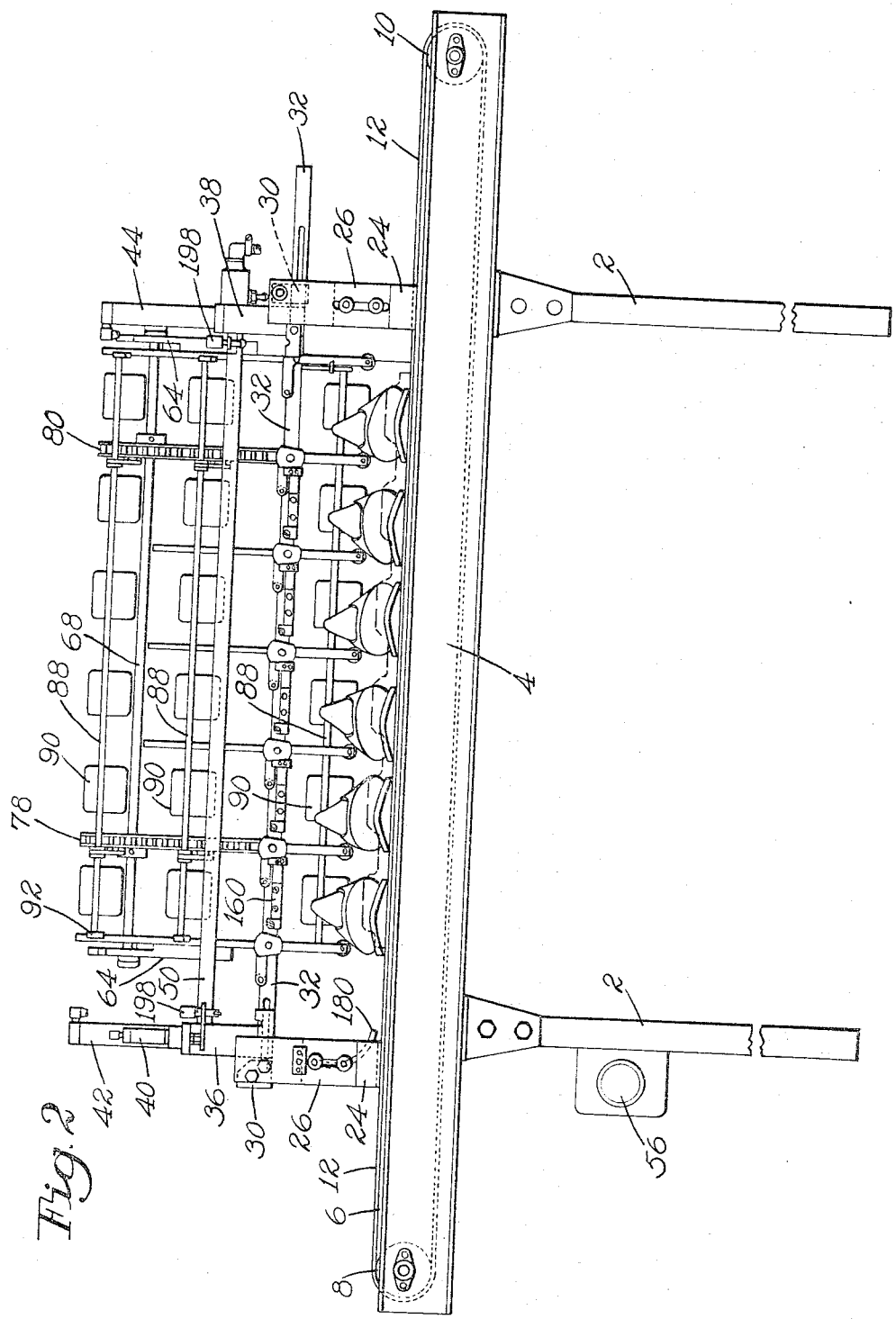

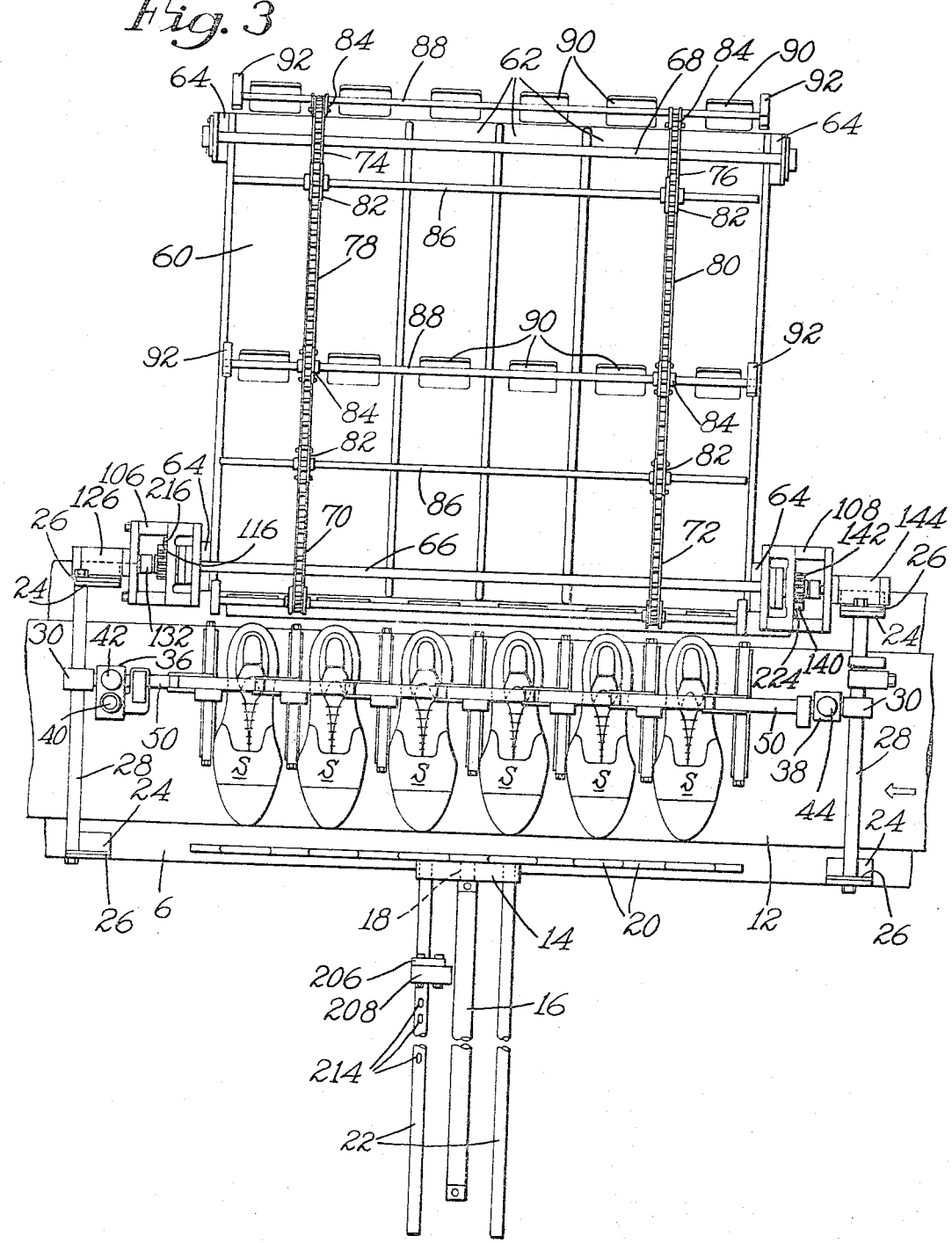

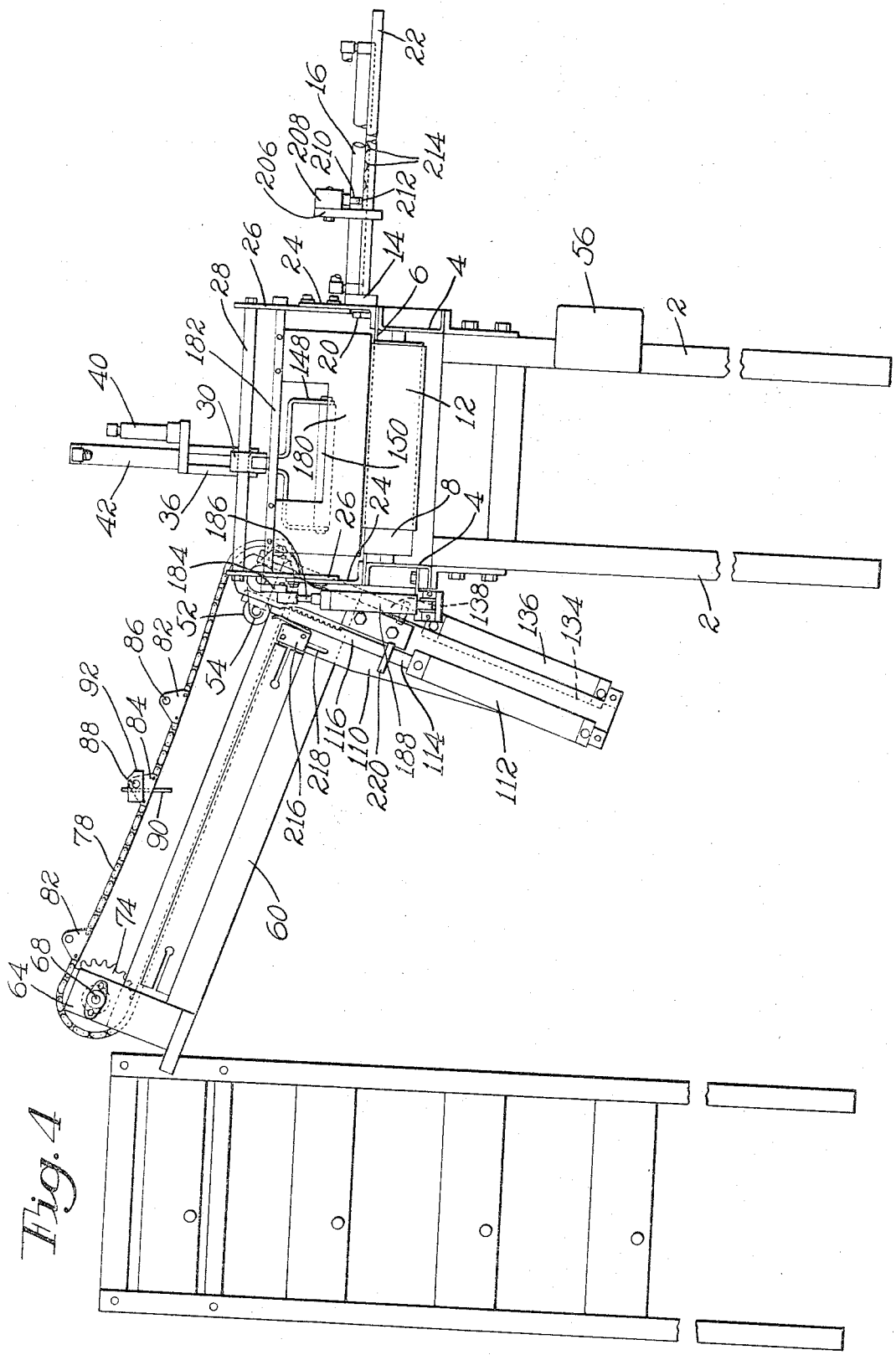

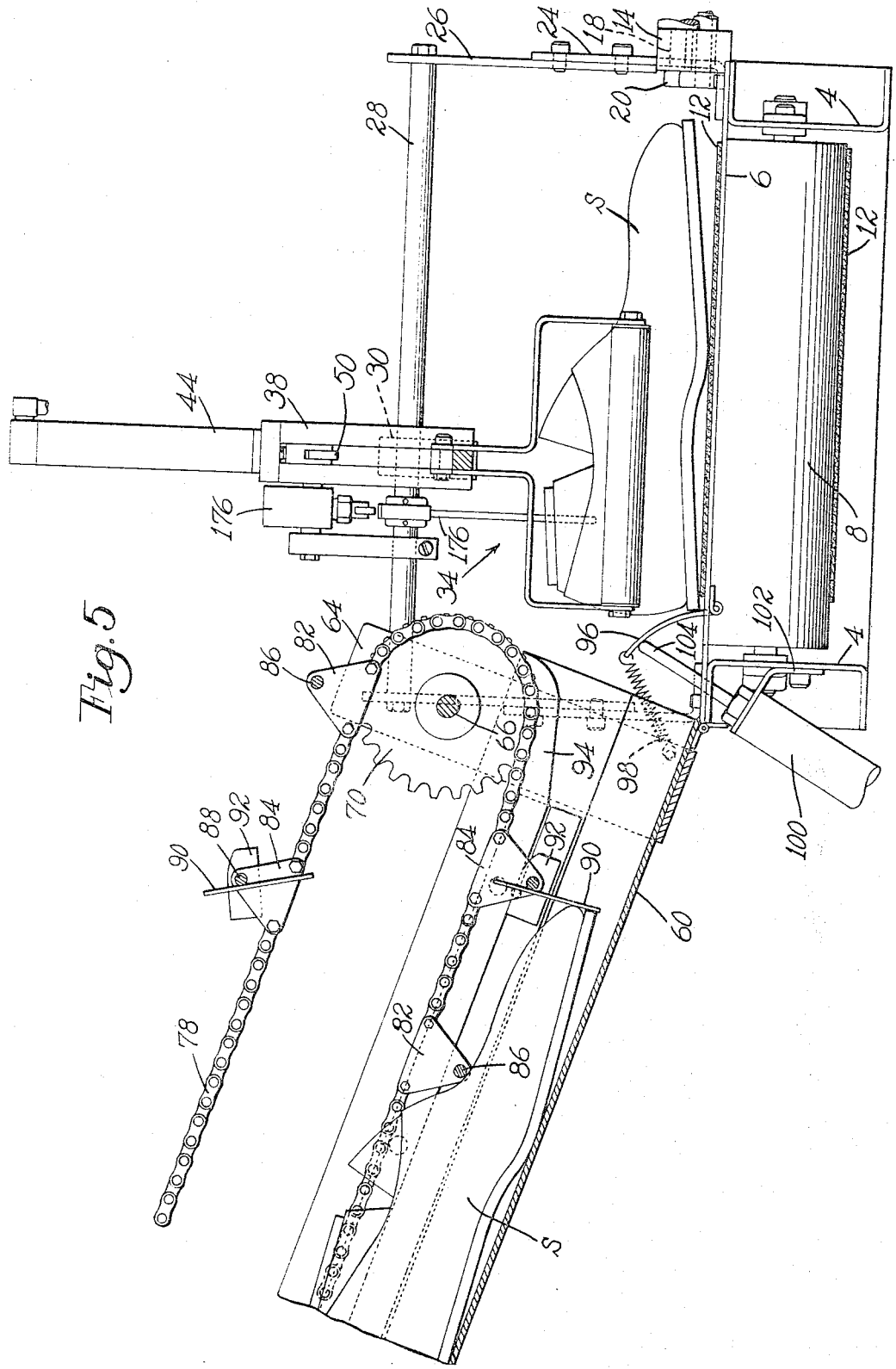

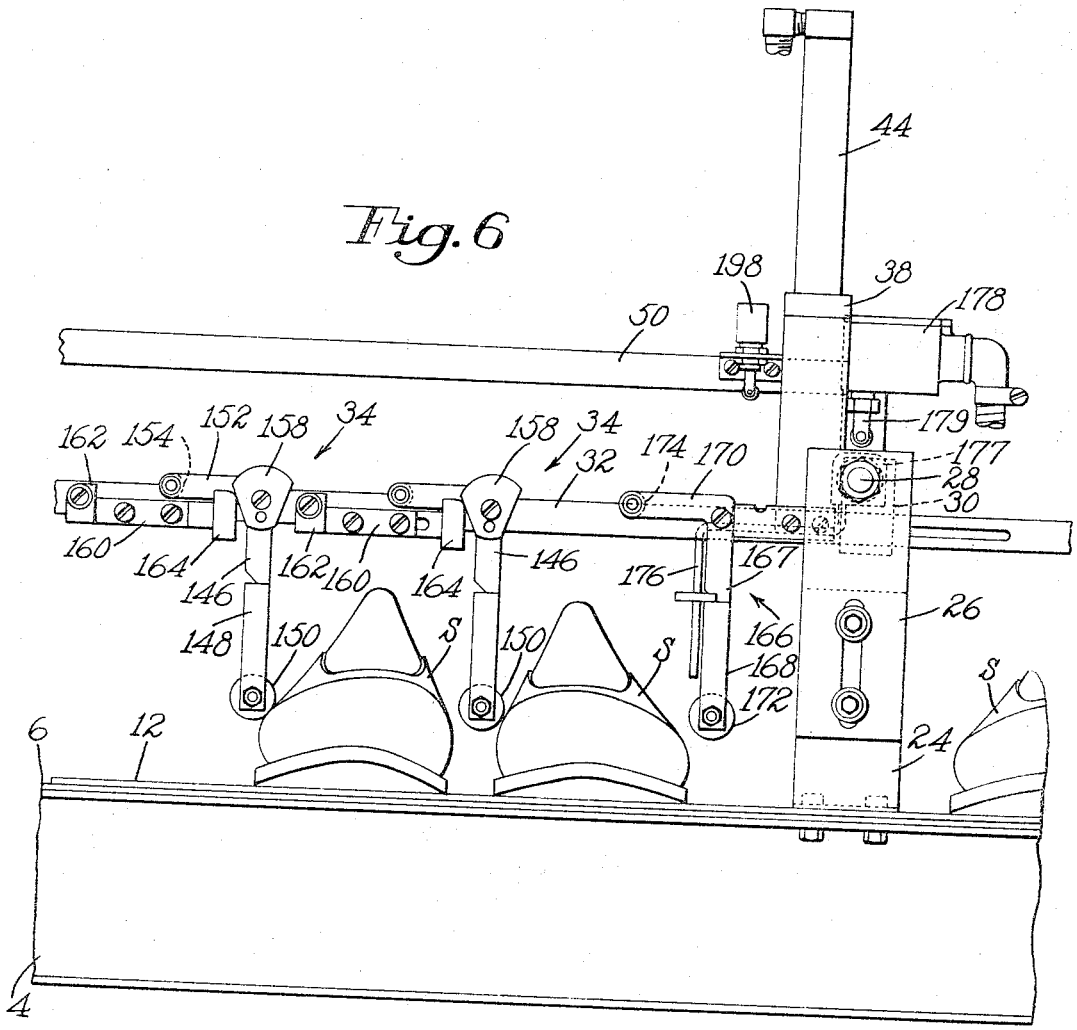

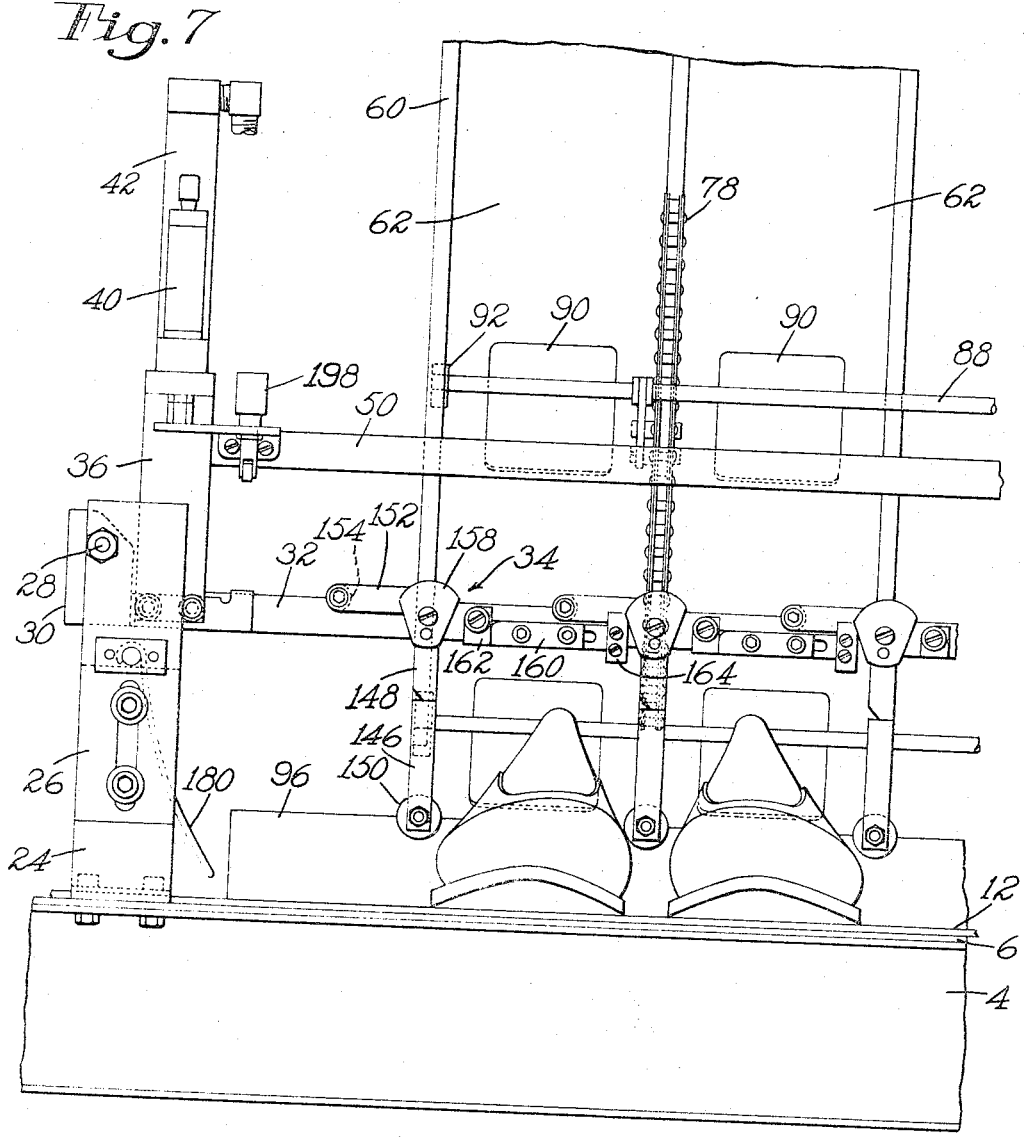

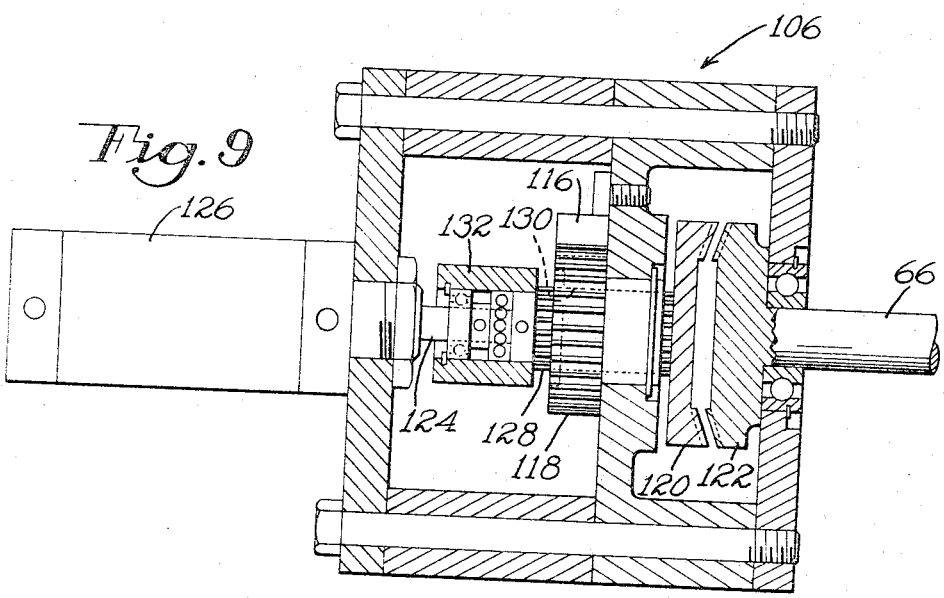
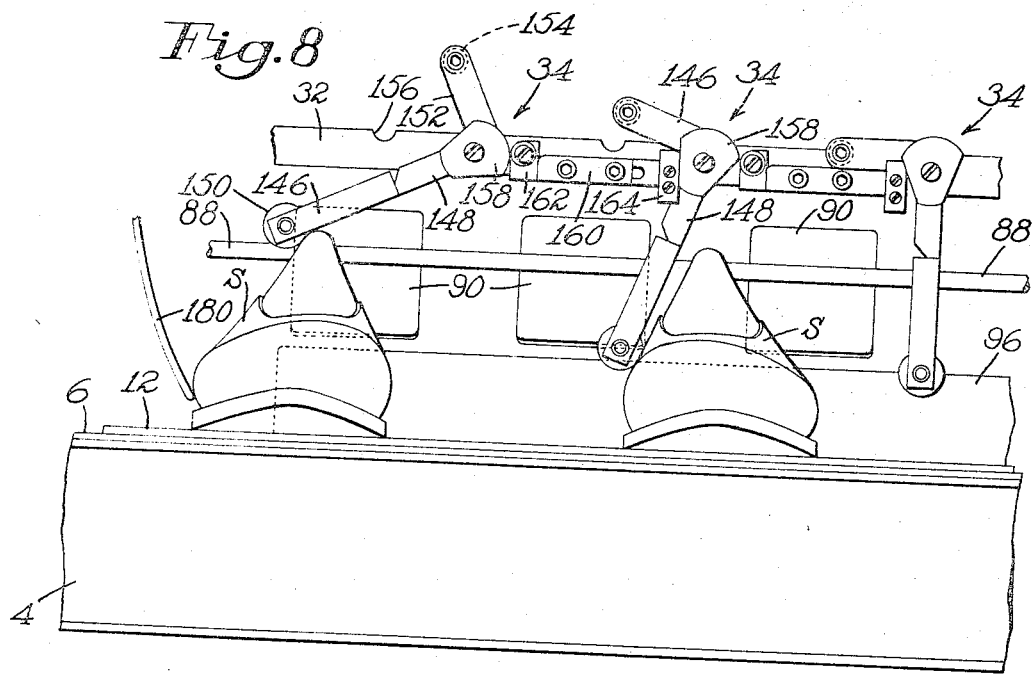

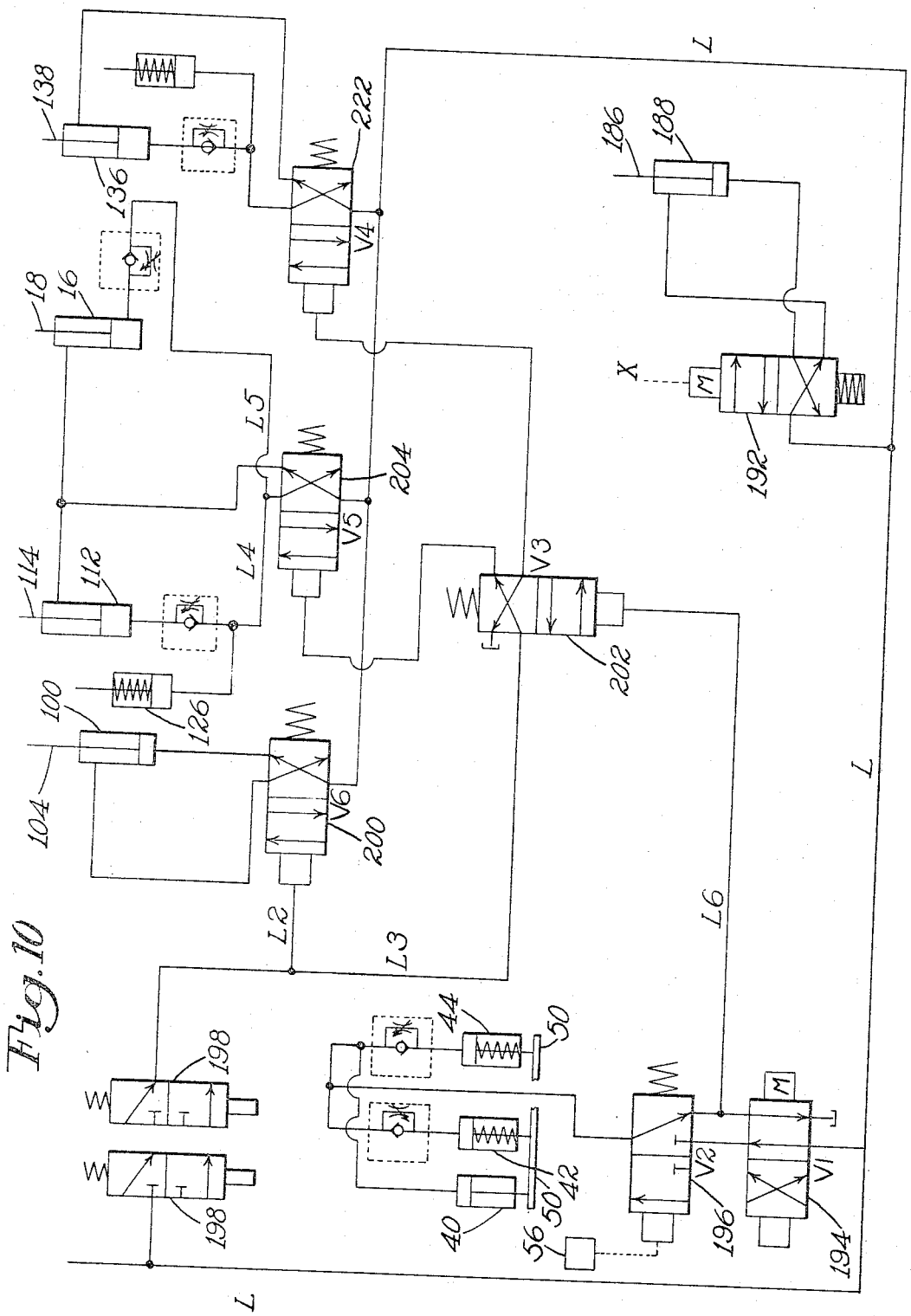

3,337,021
AUTOMATIC TRANSFER DEVICES
James R. Stewart, Salem, Mass., assignor to United Shoe Machinery Corporation, Flemington, N.J., and Boston, Mass., a corporation of New Jersey
Filed Dec. 7, 1965, Ser. No. 517,152
13 Claims. (Cl. 198—31)

This invention relates generally to automatic shoe transporters and more particularly to a device for automatically transferring shoes between a moving conveyor belt and a shoe storage area.

The invention is herein illustrated in connection with machines for the manufacture of shoes. However, it will be understood that the device might be employed in connection with the production of other articles of manufacture.

In the production of shoes the trend is toward automated machinery which accepts a shoe, performs an operation upon it, and then discharges the shoe. Usually the shoe is advanced toward the machine and carried away from it by an endless conveyor belt. An example of a device for handling shoes automatically for various automatic shoemaking machines may be found in U.S. patent application S.N. 462,659, filed June 9, 1965, in the name of James R. Stewart, which discloses a device for removing a shoe from a moving belt, presenting the shoe to a shoemaking machine, and then placing the shoe on a second endless belt. One problem encountered in such automatic operations results from the unequal production rates of various machines. Thus, shoes may at one time accumulate on the conveyor belt approaching a shoemaking machine, while at other times the belt feeding the machine may be empty, awaiting arrivals from the preceding machine. Accordingly, it is an object of the present invention to provide a device which will promote the steady flow of shoes to a shoemaking machine.

Because of the shape of shoes, a line of shoes resting sideways on a moving belt tend to be urged out of sideways alignment. The heel areas being narrower than the forepart area, the shoes tend to "curve around" toward a position nearly longitudinal of the belt. These shoes so turned may be difficult or impossible for the pick-up device associated with the shoemaking machine to grasp and present to the machine. It is, therefore, another object of the present invention to provide a device which insures the proper alignment of shoes on a moving belt approaching a shoemaking machine so that the shoes may be accurately located and easily grasped by the pick-up device associated with the machine.

Despite the advances of more automated procedures in the manufacture of shoes, there still remains a great deal of hand work which is not only time consuming, but expensive. One area in which the work is still done entirely by hand is in the loading and unloading of shoe racks. Even in an automated assembly line a workman is needed to pull shoes from a shoe rack and place them on the conveyor at the starting position. Another workman is needed to remove shoes from the end point of the conveyor and place them in a shoe rack. There have recently been devised shoe rack handling machines which facilitate the unloading of standard shoe factory shoe racks. United States patent application Ser. No. 371,207, filed May 29, 1964, upon application of Basil A. Strout, shows a device which elevates a shoe rack for easier access by a shoe machine operator. United States patent application Ser. No. 481,225, filed Aug. 20, 1965, upon application of James R. Stewart, shows a device which elevates the shelves of a shoe rack sequentially to an unloading level from whence the shoes on the shelves are pushed off the shelf automatically.

It is a further object of the present invention to provide a device which will, in cooperation with devices such as those described in the above-mentioned application, provide for automatic removal of shoes from a standard shoe factory shoe rack and place them on a conveyor belt.

It is also an object of the present invention to provide a device which will remove the finished shoes from the end of the conveyor line and place them in a shoe rack.

With the above and other objects in view, as will hereinafter appear, the present invention contemplates the provision in a conveyor type assembly system of a device for automatically transporting shoes either from a standard shoe factory shoe rack to a moving belt or from the belt to the rack, or which may be used without a shoe rack for limited short term storage of shoes and which will in such instance automatically remove the shoes and return them to the belt as desired to promote an even flow to the shoemaking machine.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

Reference is made to the accompanying drawings in which there is shown an illustrative embodiment of the invention from which its novel features and advantages will be apparent.

FIG. 1 is a perspective view of one form of automatic shoe transporter embodying the invention;
FIG. 2 is a front elevational view;
FIG. 3 is a plan view;
FIG. 4 is a side elevational view;
FIG. 5 is a side elevational view of a portion of the transporter, showing a shoe in the storage area;
FIGS. 6–8 are front elevational views of portions of the transporter;
FIG. 9 is a sectional view of a clutch mechanism associated with the transporter; and
FIG. 10 is a diagram showing the pneumatic circuit of the transporter.

Referring to FIGS. 1–4, it may be seen that the illustrative machine includes a frame 2 which supports a pair of parallel angle irons 4 which in turn support a plate 6. The angle irons 4 also have mounted therebetween a pair of rolls 8, 10, which support an endless conveyor belt 12. The roll 8, when rotated by a power source not shown, causes the upper surface of the belt 12 to move from right to left, over the plate 6 as shown in FIGS. 1–3, thereby moving lasted uppers S on the belt from right to left. There is fixed to one angle iron 4 a cylinder mounting block 14 which has a cylinder 16 mounted thereon. The cylinder 16 has a piston 18 which on its free end is attached to a push plate 20 extending in a direction lengthwise of the belt 12 and normal to the cylinder 16. As may be observed in FIG. 3, when the piston 18 is drawn into the cylinder 16 the push plate 20 is drawn to one side of the belt 12 and is spaced from the shoes S. When the cylinder 16 is activated so as to extend the piston 18, the push plate 20 is caused to move widthwise across the belt. A pair of guard rods 22 are fixed to the push plate 20 and pass through bores in the cylinder mounting block 14.

Included in the illustrative machine are means for aligning and spacing the shoes S on the belt. For this purpose the plate 6 has fixed to its upper surface a number of brackets 24 to which are attached front and rear mounting members 26. Interconnecting the mounting members are support rods 28 extending widthwise over the belt and on which are disposed retaining blocks 30. The blocks 30 retain a stop assembly support rod 32 which extends lengthwise over the belt. The rod 32 supports a plurality of stop assemblies, generally designated 34, (FIGS. 1 and 6–8) which are suspended from the rod 32 and which are disposed directly in the path of a shoe moving upon the belt 12. The construction and operation of the stop assemblies will be described in detail below.

For the purpose of locking the stop assemblies 34 in a shoe stopping position there is provided on the support rod 32 a pair of cylinder housings 36, 38, retaining cylinders 42, 44, respectively, having downwardly extending pistons, the free ends of which are attached to a lock bar 50. The cylinders 42, 44 may be activated so as to raise the lock bar 50, as shown in the drawings, or to lower the lock bar until it engages the support rod 32 for purposes to be described below. The cylinder housing 36 also supports a sequence cylinder 40 (FIG. 7) which has a piston rod connected to the lock bar 50.

An inclined guideway 60, having a plurality of lanes 62, is pivotally attached to the rear angle iron 4 and extends laterally from the belt 12 and is located opposite the push plate 20. Bracket members 64 are attached to the sides of the guideway 60 and extend upwardly therefrom to rotatably support sprocket shafts 66, 68. Mounted on the shaft 66 are a pair of sprockets 70, 72; mounted on the shaft 68 are a pair of sprockets 74, 76. An endless chain 78 passes around the sprockets 70 and 74, and another endless chain 80 passes around the sprockets 72, 76. Thus, rotation of the sprocket shaft 66 causes rotation of the sprockets 70, 72, and through the chains 78, 80, rotation of the sprockets 74, 76.

The chains 78, 80 include triangularly shaped links 82, 84 (FIG. 5). The links 82 support cross rods 86 and the links 84 rotatably support paddle rods 88. The paddle rods 88 have fixed thereon a plurality of paddles 90, so spaced that one paddle 90 on each paddle rod 88 is disposed in one of the lanes 62 of the guideway 60. Accordingly, movement of the chains 78, 80 causes the cross rods 86 and paddle rods 88 to move lengthwise of the guideway 60, with the paddles 90 being moved through the lanes 62 of the guideway. On the ends of the paddle rods 88 there are disposed lugs 92 which, at the belt end of the guideway engage cam members 94 (FIG. 5) which cause the lugs to assume a position whereby the paddle rods 88, and therefore the paddle 90, are positioned so that the paddles 90 are disposed to engage the toe of a shoe at the belt end of the guideway 60. As shown in FIG. 5, the cross rods 86 and paddles 90 cooperate to move a lasted shoe away from the belt 12 and up the inclined guideway 60.

On the side of the belt adjacent the guideway 60, there is pivotally attached to the plate 6 a curved back plate 96 (FIG. 5), the free end of which is held by one end of a coil spring 98 which is anchored at its other end to the guideway 60. A back plate cylinder 100 is attached by a bracket 102 to the angle iron 4. The free end of a piston rod 104 of the cylinder 100 is engageable with the back plate 96. Before a shoe S is pushed rearwardly (to the left as viewed in FIG. 5), the spring 98 pivots the back plate downwardly, when the piston rod 104 is drawn into the cylinder 100, as will be explained hereinafter, permitting the shoe to be moved over the back plate 96 and onto the guideway 60.

Gear boxes 106, 108 (FIG. 3) are disposed in axial alignment with either end of the sprocket shaft 66. The gear box 106 provides for movement of the cross rods 86 and paddle rods 88 upwardly of the guideway 60, or away from the belt 12, and the gear box 108 provides for reverse movement toward the belt. A bracket 110 (FIG. 4) fixed to the guideway 60 supports an up-gear cylinder 112, the piston 114 of which has fixed to its free end a rack 116. The rack 116 is engageable with a pinion 118 (FIG. 9) in the gear box 106. In the gear box 106 a gear 120 is engageable with a gear 122, the gear 120 being fixed to the free end of a piston rod 124 extending from a clutch cylinder 126, and the gear 122 being fixed to one end of the sprocket shaft 66. A portion of the piston rod 124 has longitudinally extending splines 128 which mesh with splines in a bore 130 in the pinion 118. Thus, when the clutch cylinder 126 extends the piston rod 124 it is movable axially in the bore 130 of the pinion 118, and when the rack 116 is extended by the up-gear cylinder 112 the piston rod 124 is caused to rotate by the rotation of the pinion 118. The rotational movement of the piston rod 124 is transmitted through the gears 120, 122 to the sprocket shaft 66. A bearing assembly 132 supports the piston rod 124 for axial and rotational movement. A roller 52 (FIG. 4) rotatably mounted on a bracket 54 engages the rack 116 and stabilizes the rack when it is extended from the up-gear cylinder 112.

On the side of the guideway 60 opposite the bracket 110 there is fixed to the guideway another bracket 134 which supports a down-gear cylinder 136 (FIG. 4). From the down-gear cylinder 136 there extends a piston rod 138 to the free end of which is attached a rack 140 (FIG. 3). The gear box 108 is constructed in the same manner as the gear box 106. When the down-gear cylinder 108 extends its piston rod 138, the rack 140 acts upon a pinion 142 to rotate the sprocket shaft 66 in such a manner as to advance shoes in the guideway 60 toward the belt 12. A clutch cylinder 144 is associated with the gear box 108 in the same manner that the clutch cylinder 126 is associated with the gear box 106.

Referring particularly to FIGS. 6 and 8, there will now be described the stop assemblies 34. Each stop assembly 34 has a bell crank 146 comprising a bifurcated arm 148 on which is mounted a roller 150 and a bifurcated arm 152 having a roller 154 which is engageable with a depression 156 (FIG. 8) in the support rod 32. At the fulcrum of the bell crank 146 there is mounted a cam member 158 which is pivotally mounted on the support rod 32. Slidably mounted on the support rod 32 between the stop assemblies 34 are slide members 160 each having attached thereto a downstream lug 162 and an upstream lug 164. ("Downstream" and "upstream" refer to the right to left movement of the belt 12, as viewed in FIG. 1.) The downstream lugs 162 are engageable with the cam member 158 of the adjacent downstream stop assembly. The upstream lugs 164 are engageable with the cam member 158 of the adjacent upstream stop assembly. Referring to FIG. 8, it will be seen that when a bell crank 146 is pushed to the left, as viewed in that figure, by a shoe, the cam member 158 of that bell crank rotates so as to engage the downstream lug 162 of the slide member 160 and prevent that slide member from sliding leftwardly, or downstream, on the bar 32. Since the slide member 160 cannot slide leftwardly, the upstream lug 164 of that slide member prevents rotation of the next upstream bell crank and thereby prevents the entry of a shoe into an occupied space.

Referring to FIG. 6, it will be seen that before a shoe reaches the first stop assembly, it engages a gate member 166 comprising a bell crank 167 having bifurcated arms 168, 170, each supporting at its outer end a roller, 172, 174, respectively. The gate member is pivotally attached at its fulcrum to the support rod 32. A finger 176 is connected to a block 177 which is pivotally supported by the support rod 28. The finger 176 is engageable with the arm 168 of the gate member 166 and serves to pivot the block 177 on the rod 28 so as to engage a plunger 179 of an "add" switch 178. The add switch relay sends a "+1" signal to an automatic counter 56, which is a known, commercially available device. Thus, each time a shoe passes by the gate 166, the counter 56 records the fact that one shoe has been received by the device.

Close to the downstream end of the belt 12 there is disposed an exit gate 180 (FIGS. 1 and 4) suspended on a rod 182 rotatably mounted in the mounting members 26. A linkage 184 (FIG. 4) interconnects one end of the rod 182 and one end of a piston rod 186, the other end of which is disposed in an exit gate cylinder 188. When the exit gate cylinder 188 extends the piston rod 186 it causes, through the action of the linkage 184, the rod 182 to rotate and thereby pivot the exit gate 180 upwardly whereby to permit a shoe to pass thereunder. A finger 190 is attached to the exit gate 180 and operates in the same manner as the finger 176 to cause a "−1" signal to be sent to the counter. Accordingly, each time a shoe passes under the exit gate 180, the counter 56 records the fact that there is one less shoe in the device. The exit gate cylinder 188 is controlled by the shoemaking machine to which shoes are being fed. Thus, if the machine is ready to operate upon another shoe it signals the exit gate cylinder to "lift" the exit gate to permit another shoe to leave the transfer device and enter the shoemaking machine.

To illustrate the operation of the device there shall be discussed the sequence of events when the device is used to relieve "surges" of shoes along a belt-fed assembly line. A shoe S is carried on the upper surface of the belt 12 to a point where it engages the roller 172 (FIG. 6) of the gate member 166. As the gate member 166 pivots about its fulcrum the finger 176 closes the add switch 178 and the fact that one shoe is in the device is registered on the automatic counter 56. In short order the shoe S clears the gate member 166 which drops back to its original position. The shoe S then engages the roller 150 of the first stop assembly and, assuming another shoe is not in the adjacent downstream station, pivots the first bell crank 146 and passes thereunder. The shoe S passes "through" each stop assembly until it reaches the exit gate 180. If the shoemaking machine being fed is ready to receive another shoe the gate 180 will be in the raised position, permitting the shoe to pass thereunder and proceed directly to the machine. Inasmuch as the shoe has been positioned on the belt by the stop assemblies and inasmuch as it has not been in contact with another shoe since entering the transfer device, it advances on the belt toward the machine in a position generally normal to the direction of travel of the belt. Each succeeding shoe will approach the shoemaking machine in the same attitude, facilitating smooth operation of the shoe pickup device associated with the shoemaking machine.

Referring to FIG. 10, it will be seen that a signal from the shoemaking machine circuit X shifts an exit gate cylinder valve 192 to permit air from a main air line L to pass through the valve 192 and into the head end of the exit gate valve 188. The gate valve piston rod 186 is thereby extended from the cylinder 188 and, through the linkage 184 (FIG. 4), pivots the rod 182 to lift the exit gate 180. Lifting of the exit gate 180 operates a subtract switch which sends a −1 signal to the automatic counter 56. If the shoemaking machine is not yet ready to receive another shoe, the exit gate cylinder valve 192 (FIG. 10) remains in the spring biased position, connecting the main air line L to the rod end of the exit gate cylinder 188, holding the gate 180 in the "down" position. In the down, or closed, position the gate 180 is engaged by a shoe before the shoe can pass through the last stop assembly, causing the shoe to stop in a position shown in FIG. 8. In such position the shoe causes the cam member 158 of the last stop assembly to assume a position which will prevent the downstream movement of the most downstream slide member 160 which will in turn prevent pivoting of the next upstream bell crank 146 so that a shoe, in coming in contact with that stop assembly, will be prevented from passing through. In like manner, shoes are stopped station by station upstream.

If shoes are flowing along the belt at a rate faster than the rate at which the shoemaking machine is operating, eventually the device will have accumulated six shoes at a time when the shoemaking machine is still not ready to receive another shoe. Rather than permit the shoes to "pile up" at the entrance of the device, the device operates to remove the six shoes from the flow of traffic to permit normal flow.

Referring again to FIG. 10, it will be seen that the device has an "up-down" valve 194 which is illustrated as a manually controlled valve, but which may be either manually or automatically controlled. Assuming a high flow rate is expected along the belt, the valve 194 is set in the "up" position, as shown in FIG. 10. When the automatic counter registers +6 the counter signals a counter-controlled valve 196 to shift against spring pressure. Upon shifting, the valve 196 permits air from the valve 194 to pass to the head end of the locking bar cylinders 42, 44 and through to the head end of the sequence cylinder 40, causing the locking bar 50 to move downwards toward the support bar 32. As the locking bar 50 nears the support bar 32 it engages the rollers 154 held between the bifurcated arms 152 of the bell crank 146 and urges the rollers downwardly into the depressions 156 on the support bar. Movement of the arms 152 downwardly pivots the bell cranks 146 on the bar 32, causing the arms 148 of the bell cranks to assume a generally vertical attitude and in so doing lining up the shoes S with the lanes 62 of the guideway 60.

A pair of unload valves 198 (FIG. 2) are fixed to the locking bar 50 and are opened by engagement with the support bar 32. Turning again to FIG. 10, air passes from the line L, through the unload switches 198, and into an air line L2 to shift a spring biased back plate cylinder valve 200 which sends air to the rod end of the back plate cylinder 100 to drawn in the back plate cylinder piston rod 104, which permits the back plate 96 to be drawn downwardly by the spring 98 (FIG. 5). Opening of the unload valves 198 also sends air through an air line L3 (FIG. 10) and through a spring positioned 4-way valve 202 to shift an unload 4-way valve 204. Upon shifting of the valve 204, air from the air line L enters an air line L4 and is directed to the up-gear clutch cylinder 126 and a time delay restrictor r1. Air in the up-gear clutch cylinder moves the gear 120 into intermeshing engagement with the gear 122 (FIG. 9). After a time delay sufficient to insure engagement of the gears 120, 122 air enters the head end of the up-gear cylinder 112 (FIG. 4) which extends the up-gear cylinder piston rod 114 and thereby the up-gear rack 116. The teeth of the rack 116 engage the teeth of the pinion 118 to rotate the sprocket shaft 66 (FIG. 9).

Air from the unload 4-way valve 204 enters an air line L5 (FIG. 10) at the same time as it enters the line L4. Air in the line L5 passes through a restrictor r2 and into the head end of the push bar cylinder 16, causing extension of the push bar cylinder piston rod 18 (FIG. 3). Extension of the rod 18 from the cylinder 16 causes the push plate 20 to move widthwise over the belt. In doing so, the bush plate engages the toes of the shoes and pushes the shoes over the lowered back plate and into the lanes 62 of the guideway 60 where the shoes are engaged by one of the cross rods 86 moving away from the belt 12. As the shoe is pulled up into the guideway, the toes of the shoes may be engaged by the paddles 90 mounted on the paddle rods 88, depending upon the size and style of shoes in transit. As the push plate 20 moves across the belt 12 it carries with it the guard rods 22 which are slidable through the push cylinder mounting block 14.

Connected to the push plate cylinder 16 is a bracket 206 (FIGS. 1, 3, 4) on which is mounted a counter switch 208 having a spring biased plunger 210 carrying a roller 212 which rolls along the guard rod 22 when the rod 22 is moving. The guard rod with which the roller 212 is in engagement has a series of five depressions 214 on its surface over which the roller 212 will travel. The plunger 210 is extended each time the roller 212 enters a depression 214 and activates the counter switch, which for each plunger extension sends a −1 signal to the automatic counter. Thus, when the push plate reaches a position fully across the belt, a total of −5 has been registered in the counter, bringing its total down from +6 to +1.

Referring to FIG. 4, it will be observed that another counter switch 216 is fixed to one side of the guideway 60. The switch 216 has a plunger 218 which is engageable by a disc 220 fixed to the up-gear cylinder piston rod 114. When the disc 220 engages the plunger 218, which happens at the end of the upward stroke of the rack 116, the counter switch 216 sends a −1 signal to the automatic counter which is thereby returned to a zero setting.

When the counter setting is returned to zero the signal from the counter 56 to the counter-controlled valve 196 is terminated and the counter-controlled valve returns to its spring biased position, as shown in FIG. 10. The locking bar cylinders 42, 44 and the sequence cylinder 40 are exhausted, allowing the locking bar 50 to return to its upward position and thereby releasing the unload valves 198. The unload valves shift under spring pressure to exhaust the air lines L2 and L3. When L2 exhausts it permits the back plate cylinder valve 200 to shift, which exhausts air from the rod end of the cylinder 100 and feeds air to the head end, causing extension of the back plate cylinder piston rod 104 and thereby upright positioning of the back plate 96. When L3 exhausts it permits the unload 4-way valve 204 to shift to the position shown in FIG. 10 which in turn exhausts the air lines L4 and L5 and thereby the head ends of the up-gear clutch cylinder 126, the up-gear cylinder 112 and the push plate cylinder 16. Air from the line L passes through the valve 204 to the rod ends of the up-gear cylinder 112 and push plate cylinder 16 to draw in the push plate cylinder piston rod 18 and the up-gear cylinder piston rod 114 and rack 116. Exhausting the head end of the clutch cylinder 126 disengages the gears 120, 122 so that the downward movement of the rack 116 is not transmitted to the shaft 66. The device is now in condition to accept shoes and the counter is in condition to commence registering from zero.

As illustrated, the device is capable of storing three tiers of shoes, or a total of eighteen. It will be appreciated that using the same system of operation, a guideway having facility for storing any number of shoes may be utilized to greatly increase the storage potential of the device.

When traffic on the belt has slowed, an operator may return the stored shoes to the belt by manually shifting the up-down valve 194 to the "down" position (opposite that shown in FIG. 10) which passes air to an air line L6 which shifts the 4-way valve 202. Air from the valve 194 also passes through the valve 196 to operate the sequence cylinder 40 and the locking bar cylinders 42, 44 which lower the locking bar 50 which opens the valves 198. Air from the air line L passes through the valves 198 to the air line L2 to lower the back plate as described above, and also through the shifted valve 202. From the valve 202 air is directed to a belt load 4-way valve 222 to shift that valve. Shifting of the valve 222 sends air to the head end of the down-gear clutch cylinder 144 (FIG. 3) and, through a time delay restrictor r3, to the head end of the down-gear cylinder 136 which extends its piston rod 138 (FIG. 4) and rack 140 (FIG. 3) to rotate the shaft 66 in a direction whereby to move the shoes in the guideway toward and onto the belt 12.

When the rack 140 is fully extended upwardly it engages a switch 224 (FIG. 3) which sends a +6 signal to the automatic counter which then causes the counter-controlled valve 196 to shift against spring pressure. The shifting of the counter-controlled valve 196 immediately exhausts the head end of the sequence cylinder 40, which causes the downstream end of the lock bar 50 to raise slightly to a point heightwise where it is prevented from raising further by the piston rod of the cylinder 42. The head ends of the cylinders 42, 44 are more slowly exhausted through the restrictors r4, r5 and raise the locking bar well clear of the bell cranks 146. The downstream end of the locking bar is permitted to raise slightly ahead of the upstream end of the bar so that the most downstream assembly and its adjacent slide member will move freely to permit each stop member sequentially upstream to move freely and permit the shoes on the belt to move toward the shoemaking machine. Lifting of the bar 150 releases the valves 198 which in turn cause release of the valves 200, 222 for repositioning the back plate and the down gear rack and clutch. As soon as a shoe goes through the exit gate the counter is no longer at +6 and the counter-controlled valve 196 returns to its spring biased position as shown.

The device can be used at the beginning of a shoe assembly line for transferring shoes from an automatic rack unloader, as described in U.S. patent application Ser. No. 481,225, filed Aug. 20, 1965, upon application of James R. Stewart, to a moving belt. In this instance the up-down valve 194 would remain in the "down" position and, in the case of permanent installations, the pneumatic circuit could be simplified to provide for downward flow only.

The device can also be used at the end of a shoe assembly line for transferring finished shoes from a belt to a shoe rack. An automatic shoe rack positioner, as described in U.S. patent application S.N. 371,207, filed May 29, 1964, now Patent No. 3,252,580, upon application of Basil A. Strout, but indexed for a number of stops equal to the number of shelves in the shoe rack, may be used to receive rows of shoes being transferred from a moving belt by the present device. In such case, the down-gear elements need not be provided if the installation is to be permanent.

When the machine is used as illustrated to insure even flow along an assembly line, the up-down valve need not be manually operated. For totally automatic handling, the up-down valve may be made responsive to a zero reading from the automatic counter, together with a signal from the guideway that shoes are there, to shift the up-down valve from the "up" to the "down" position. Also, when used to even the flow in an assembly line the device may be connected to the automatic rack unloader described in the above-mentioned Stewart patent application, for increased storage capacity, the shoes being transferred, after the guideway is filled, to sequentially positioned shelves of a rack positioned by the automatic rack unloader.

Since certain obvious changes may be made in the illustrated device without departing from the scope of the invention, it is intended that all matters contained herein be interpreted in an illustrative and not limiting sense.

Having thus described my invention, what I claim as new and resire to secure by Letters Patent of the United States is:

1. An automatic transfer device for incorporation into an assembly line system in which irregular articles are transported by conveyor belts, comprising means for stopping the movement of articles on a moving belt, means for uniformly orienting said articles, means for automatically counting the number of said articles stopped, and means responsive to the counting means for removing said articles from the belt and for returning said articles to said belt.

2. The invention according to claim 1 in which said article removing means comprises means for removing a plurality of said articles simultaneously from the belt.

3. The invention according to claim 1 including means for transporting said articles to a storage area.

4. An automatic transfer device for incorporation into an assembly line system in which articles are transported by conveyor belts, comprising means for stopping the movement of at least one article on a moving belt, means for removing one or more of said articles from the belt, means for transporting one or more of said articles to a storage area, and means for reversing the direction of travel of said article transporting means for moving the article from the storage area back to the belt.

5. An automatic transfer device for incorporation into an assembly line system in which articles are transported by conveyor belts, comprising a plurality of stops arranged to stop the movement of articles on a moving belt, means for automatically counting the number of said articles stopped, means responsive to the counting means for removing said articles from the belt, said removing means comprising a push bar moving widthwise of the moving belt, and means for transporting said articles to a storage area.

6. An automatic transfer device for incorporation into an assembly line system in which articles are transported by conveyor belts, comprising a plurality of stops arranged widthwise of a moving belt for stopping the movement of articles on the belt, means for automatically counting the number of articles stopped, means responsive to the counting means for removing a predetermined number of the articles simultaneously from the belt, said removing means comprising a push bar movable widthwise of the belt and between the belt and said stops, a plurality of storage lanes extending in a direction normal to the belt and arranged to receive respectively the articles removed from the belt, and means for moving the articles in said lanes to points further removed from the belt.

7. The invention according to claim 6 including means for reversing the direction of travel of said article moving means for returning said articles to said belt.

8. The invention according to claim 6 in which said article moving means comprises pusher means movable longitudinally of said lanes.

9. The invention according to claim 8 in which said pusher means are further movable for moving the articles in the lanes back toward and onto the belt.

10. An automatic transfer device for incorporation into an assembly line system in which articles are transported by conveyor belts, comprising a plurality of stops arranged to stop the movement of articles on a moving belt, means for automatically counting the number of said articles stopped, means responsive to the counting means for removing said articles from the belt, said removing means comprising a push bar moving widthwise of the moving belt, a plurality of lanes extending in a direction widthwise of the belt and at one end being adjacent to the belt, said lanes being arranged to receive respectively the articles removed from the belt, means for moving the articles in said lanes in a direction away from the belt, and a storage unit connected to the other end of the lanes, said article moving means being adapted to move the articles from said lanes into the storage unit.

11. An automatic transfer device for incorporation into an assembly line system in which articles are transported by conveyor belts, comprising means for aligning a plurality of articles on a conveyor belt, means for counting the number of articles so aligned, and means responsive to said counting means for removing a predetermined number of articles from said belt.

12. An automatic transfer device for incorporation into an assembly line system in which articles are transported by conveyor belts, comprising means for aligning a plurality of articles on a conveyor belt, means for counting the number of articles so aligned, means responsive to said counting means for locking a predetermined number of said articles in their aligned position, and means further responsive to said counting means for removing said articles from said belt.

13. The invention according to claim 12 in which said article removing means comprises a pusher member movable widthwise across said belt.

References Cited
UNITED STATES PATENTS

| | | | |
|---|---|---|---|
| 1,901,715 | 3/1933 | Young | 53—62 |
| 2,843,250 | 7/1958 | Niederer et al. | 198—40 X |
| 3,037,610 | 6/1962 | Morton et al. | 198—40 |

EVON C. BLUNK, *Primary Examiner.*

A. C. HODGSON, *Assistant Examiner.*